June 26, 1962  J. W. SKANTZ  3,040,631
PORTABLE POWER-OPERATED CUTTING TOOLS
Filed Sept. 22, 1959
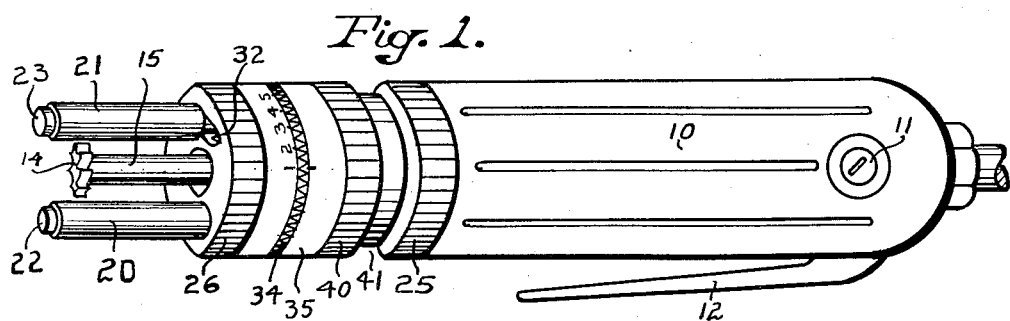
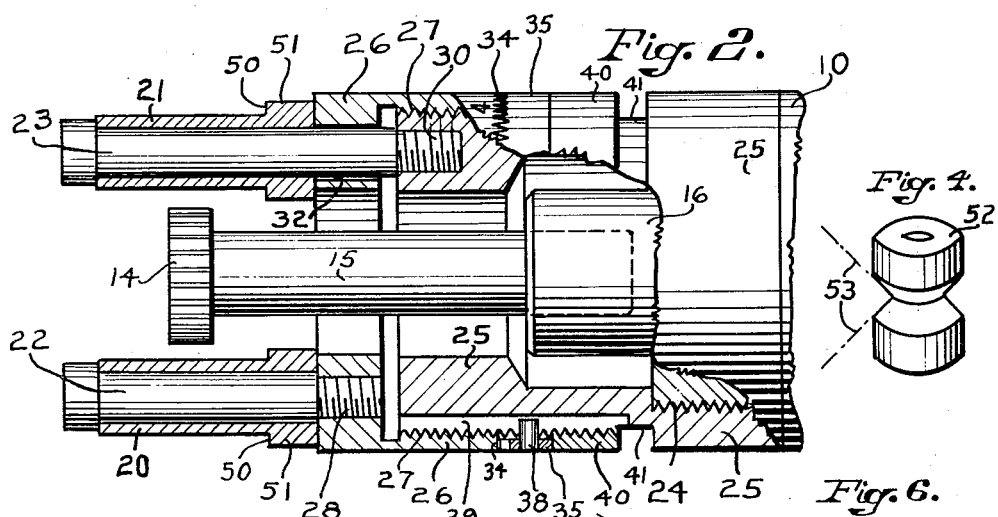
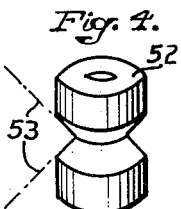
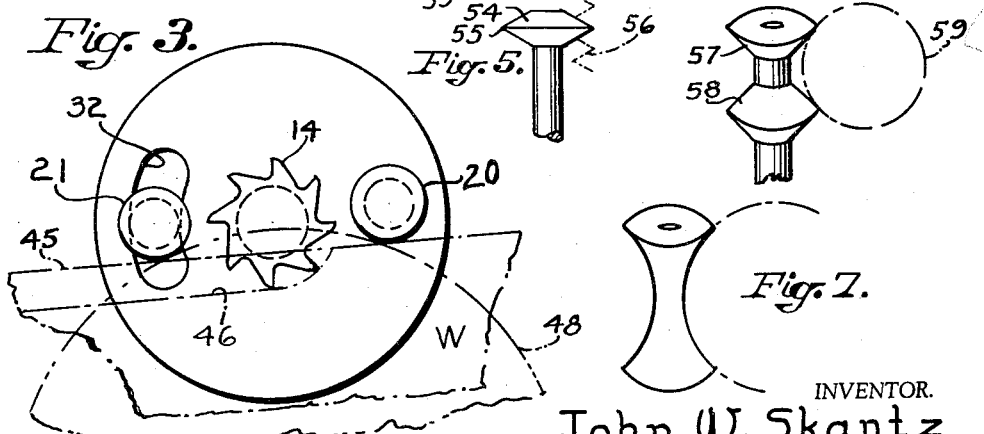
INVENTOR.
John W. Skantz
BY
Clayton L. Jenks
ATTORNEY

United States Patent Office 3,040,631
Patented June 26, 1962

3,040,631
PORTABLE POWER-OPERATED CUTTING TOOLS
John W. Skantz, 24 Bowen St., West Boylston, Mass.
Filed Sept. 22, 1959, Ser. No. 841,605
3 Claims. (Cl. 90—12)

This invention relates to portable power-operated cutting tools.

A standard type of portable tool comprises a body sized to be held in the hand and which carries a motor, such as an electric or pneumatic motor, connected to rotate a cutting or abrading tool. This device has been limited to performing the cruder types of operation, since it is difficult to form a geometric surface free from scallops or other imperfections due to the unsteadiness of the operator's hand. The tool has, therefore, been used mainly for removing burrs and similar imperfections on a casting or other type of work and for abrading small surface areas. On the other hand, it is desirable to grind a chamfer or to de-burr an edge or to make a cut of geometric shape and dimensions as well as to perform precision cutting operations by means of a hand guided tool.

The primary object of this invention is to provide a standard portable tool with adjustably positioned guides which will limit the depth or position of cut performed by the cutting tool and will otherwise serve to provide a position control for the tool which insures a precision operation.

Another object is to provide guides for a portable tool which may be adjusted to vary the depth of cut or the location of the cutting tool and which insures a uniform depth of cut. Other objects will be apparent in the following disclosure.

Referring to the drawings which illustrate one preferred embodiment of the invention:

FIG. 1 illustrates a standard pneumatically operated power tool equipped with a milling cutter and embodying the adjustable guides of this invention arranged for performing a milling operation;

FIG. 2 is an enlarged detail, largely in section, showing the cutting end of the tool having the guide rollers mounted thereon;

FIG. 3 is a diagrammatic view of the operative end of the tool showing the relationship of the adjustable rolls to the depth of cut made by the cutting tool on both a flat and a cylindrical workpiece; and FIGS. 4 through 7 show various forms of guide roller required for the different types of cutting operations.

Referring first to FIGS. 1 and 2, the tool body 10 and its associated motor may be of any standard construction, as is well known in the art, and it may comprise an electric motor of suitable speed and power characteristics, or it may comprise a pneumatic tool, as shown, having air under pressure admitted to a suitable turbine type of rotor having a speed control valve 11 and a manually operated lever 12 for controlling the rotation of the tool. The cutting tool 14, which is suitably mounted on a shaft 15 carried in a suitable chuck 16, is rotated by means of the power mechanism carried in the body of the tool. The chuck is of standard type and so constructed that the cutter 14 and its supporting shaft 15 may be removably interchanged with other suitable tools. The tool 14 is shown as a milling cutter adapted to cut a straight slot 46 in a flat workpiece W, or a circular slot in a round workpiece, as indicated in FIG. 3, but other suitable cutting tools may be employed for the different types of operation to be performed, such as an abrasive wheel or a rotary file.

The primary feature of this invention comprises guides 20 and 21 which are so positioned as to engage a surface or edge portion of the workpiece and both limit the depth of cut and guide the tool with a precision accuracy relative to the work. The guides which may involve other shapes, such as shown in FIGS. 4 to 7 inclusive, are preferably made as rollers 20 and 21 mounted for free rotation about their axes on axles 22 and 23 respectively arranged parallel with the axis of the cutting tool. They are held in place by suitable heads on the ends of their axles. To vary the depth of cut or the position of the cutting tool relative to the work, the guide roller 20 is mounted for adjustment concentrically of the axis of the cutter 14, so that the operative lines or points of contact of the two guides with the work may lie in either a straight line or a circle of required diameter, as indicated in FIG. 3.

Various constructions may be employed for mounting and relatively adjusting the guide rollers. As shown in FIG. 2, a reduced end of the body 10 is externally threaded at 24 and carries a sleeve 25 threaded thereon which is axially concentric with the cutting tool. A cap 26 is adjustably threaded at 27 on the outside of the sleeve 25, as is best shown at the top of FIG. 2. The axle 22 of the movable roller 20 is removably threaded at 28 into the outer end portion of that cap, so that it may be revolved by rotating the cap. The other roller 21 has its axle 23 threaded at 30 into the end of the sleeve 25 which is held by its threads 24 on the tool body 10. The guide roller 21 extends through a slot 32 in the end of the cap 26, and that slot is arcuate and long enough to permit the other roller 20 and its cap to be revolved as required. Each axle 20 or 21 is shaped as a headed bolt, as shown in FIG. 2, wherein the head holds the roller in place.

To provide for adjustably positioning the guide rollers, the cap is so arranged that it may be rotated to a desired position and then locked in place. In the form illustrated, the inner end of the cap 26 has a serrated face 34 adapted to engage a similarly shaped face on a ring 35 which is slidably mounted on the external threads of the sleeve 25. The ring carries a key or pin 38 which rides in a slot 39 in the sleeve 25 arranged parallel with the axis of the tool shaft and sleeve, so that the ring cannot rotate relative to the tool body on which the ring is mounted. A lock nut 40 is threaded on the sleeve 25, and a slot 41 between it and the adjacent face of the tool permits endwise and rotary movement of the lock nut. This nut is adapted to be moved against the ring 35 and clamp it against cap 26 and hold the latter immovable because of the serrations on their knurled faces. The relative positions of the parts, and therefore the degree of out of alignment of the axes of the rollers and the cutter, may be indicated by numerals on one part and an index line on the other, as shown in FIG. 1.

It will now be appreciated that the axial position of the adjustable roller 20 relative to the other roller 21 and the cutter 14 determines the depth of cut made by the tool 14. If, for example, a milling cutter 14 is employed for cutting a straight slot 45 in a flat surfaced work W, as indicated in FIG. 3, then the axes of the two rollers are required to move in a straight plane parallel with the work surface and the depth of cut, indicated by the line 46, is determined by adjusting the position of the movable roller 20 to vary the radial or lateral distance of the cutter edge relative to a diameter of the cutting tool passing through the axes of roller 21. If the work surface is cylindrical, as indicated by the dotted line 48 in FIG. 3, the depth of cut may be made greater or less by suitably adjusting the cutting tool axis and moving the roller 20 according to the work diameter and depth of cut desired, and clamping the cap 26 in the adjusted position. To fix the rollers in their adjusted positions, the lock nut 40 is backed away from the clamp ring 35 to free the cap at the serrated edges. The cap is then rotated to a desired position as determined by the index numbers, after which the lock nut 40 is turned to force the serrated edges into a tight fit.

It will be appreciated that the cutting tool 14 will be chosen in accordance with the depth of cut and operation desired. Likewise, the rollers are selected according to the chosen tool and the needs of the operation. To mill a slot at a predetermined distance from the edge of the work, the rollers of FIG. 2 are each provided with a shoulder face 50 on the front of a rear cylindrical portion 51, which is sized to determine the distance of the formed slot from the plane of the two shoulder faces 50. To vary that distance the rollers may be replaced by other rollers having a different length of the raised shoulder portion. The rollers of FIGS. 1 and 3 are shown as cylindrical since the end of the tool cap 26 may provide the guide surface. The corner between the cylindrical face of the roller and the radial face 50 constitutes a guiding edge which cooperates with an edge or surface of a workpiece to locate and guide the cutting tool parallel to the work edge.

As above indicated, a pair of rollers may be provided for each different type of operation. For example, the roller 52 of FIG. 4 may be employed to control a chamfering operation. This roller may have a V-shaped cut of 90°, indicated by the lines 53, or any other suitable angle which serves as the guiding edge to engage and be guided by the outer edge surface of a cylindrical body which is to have a drilled hole provided with a chamfer axially centered relative thereto.

A V-shaped roller 54 of the type shown in FIG. 5 is found desirable for guiding a thread grinding wheel accurately to form or re-shape threads on the work. In this case, the roller is provided with a sharp edge 55 arranged in a plane perpendicular to the roller axis and shaped to ride in threads on the work, as is indicated by the dotted lines 56. The roller of FIG. 6 has two conical surfaces 57 and 58 arranged like a thread spool which are suitably spaced and adapted to ride against a tubing, for example, as is indicated by the dotted lines 59. This will guide an abrasive wheel to grind off a raised seam on the tube which is parallel with the tube axis. The roller of FIG. 7 has a concave surface which rides a cylindrical workpiece like the spool shaped roller of FIG. 6. Any other shape of roller may be employed for different operations, and the cutting tools will be likewise suitably selected for the purpose. If the burr on a tubing is to be removed, then presumably the cutting tool will be an abrading wheel or a rotary file. If a slot is to be cut, a milling cutter, as above described, is appropriate. Thus, by a suitable selection of the guide rollers and of the cutting tool, a great many precision operations may be performed by means of a hand moved power tool. However erratic may be the tool movement as controlled by the operator, the depth of cut will remain the same because of the fact that the guide rollers prevent the tool from digging in beyond the required depth. The operator has merely to hold the guide rollers properly against the work to insure accuracy of operation. If he holds the edges of the rollers against an edge surface of the work, then the cutting action proceeds parallel with the work edge. This edge contact prevents any erratic tool movement.

It will now be appreciated that I have provided a portable power-operated cutting tool with a pair of guides, which are preferably rotary, mounted on opposite sides of the work, although not necessarily diametrically of the cutting tool. The guides have operative faces arranged to contact with an edge or surface of the work, and these faces are preferably indented or concave or otherwise shaped to ride along and be guided fully by an edge or surface of the work. Means is provided for relatively adjusting the guides, and this is preferably accomplished by so mounting one of the guides that it may be adjusted concentrically of the tool axis and thereby vary the position or depth of cut of the tool. In the preferred embodiment, the mount for one guide is preferably fixed to the tool body and the mount for the other guide is preferably carried by a rotary plate or cap mounted on the front end of the tool. This plate may have an arcuate slot concentric with the tool axis so located that the mount for the guide carried by the body may project through that slot and permit the rotary plate and its guide to be revolubly adjusted to vary the positions of the guides relative to the tool axis. The means for fixing the plate in adjusted position in the embodiment illustrated comprises a sleeve or lock nut so mounted on the tool body that endwise movement parallel with the tool axis will serve to clamp against or lock the plate in its adjusted position.

It will be appreciated that various modifications may be made in this construction and that the above description of the principles of the invention and a preferred embodiment is not to be interpreted as imposing limitations on the claims appended hereto.

I claim:

1. A portable power-operated cutting tool comprising a tool body having a power operated motor and a rotary cutting tool driven thereby, a plate rotatably mounted at the rear of the tool and on the end of the body for rotation about the tool axis, said plate having an elongated arcuate slot concentric with the tool axis, a pair of rotary guides on opposed sides of the tool axis, each of which rotatively engages the work surface and has an edge guided by a work edge to position the tool relative to the work edge, an axle for one guide fixedly mounted on the body and projecting through the slot, an axle for the other guide mounted on the rotatable plate, said axles having their axes parallel with that of the cutting tool, and means for clamping the plate in different angularly adjusted positions to control the depth of cut of the cutting tool relative to the work.

2. A tool according to claim 1 in which the plate is cap-shaped and has a threaded cylindrical portion and the tool body is cylindrical and threaded to interfit with said threaded portion and provide for a rotary adjustment of the plate, and said clamping means includes a non-rotatable, axially movable member which engages said cylindrical portion and prevents rotary movement thereof.

3. A tool according to claim 1 in which the plate is freely rotatable on the tool body, said plate having a serrated rear edge, and comprising a non-rotatable ring which has a serrated forward edge engageable with said plate edge, means for keying the ring to the body for axial movement and a clamping ring threaded on the body which secures said serrations of the ring and plate in engagement and holds the plate and the associated roller fixed in a rotative adjustment.

References Cited in the file of this patent

UNITED STATES PATENTS

| | | |
|---|---|---|
| 1,752,940 | Cilley | Apr. 1, 1930 |
| 1,883,392 | Moll | Oct. 18, 1932 |
| 1,982,083 | Strand | Nov. 27, 1934 |
| 2,000,227 | Grove | May 7, 1935 |
| 2,140,120 | Tomarin | Dec. 13, 1938 |
| 2,452,818 | Williams | Nov. 2, 1948 |